United States Patent
Ozawa

(10) Patent No.: US 9,729,745 B2
(45) Date of Patent: Aug. 8, 2017

(54) MECHANISM FOR FIXING TRANSMISSION CABLES AND APPARATUS FOR READING IMAGES PROVIDED WITH THE MECHANISM

(71) Applicant: NISCA CORPORATION, Minamikoma-gun, Yamanashi-ken (JP)

(72) Inventor: Junya Ozawa, Yamanashi-ken (JP)

(73) Assignee: NISCA CORPORATION, Minamikoma-Gun, Yamanashi-Ken (JP)

(*) Notice: Subject to any disclaimer, the term of this patent is extended or adjusted under 35 U.S.C. 154(b) by 0 days.

(21) Appl. No.: 14/970,669

(22) Filed: Dec. 16, 2015

(65) Prior Publication Data

US 2016/0191721 A1    Jun. 30, 2016

(30) Foreign Application Priority Data

Dec. 25, 2014  (JP) ................................. 2014-262016

(51) Int. Cl.
  *H04N 1/04*   (2006.01)
  *H04N 1/00*   (2006.01)

(52) U.S. Cl.
  CPC ....... *H04N 1/0083* (2013.01); *H04N 1/00557* (2013.01); *H04N 2201/0081* (2013.01)

(58) Field of Classification Search
  CPC ........... G02B 26/106; G01N 21/95684; G01N 23/2251; G01N 21/6408; G03F 7/70616; G03G 15/50; G03G 15/04; G03G 15/0435; G03G 15/04045; G06T 2207/30148; G06T 7/0004; G09G 2300/0426; G09G 2300/043

USPC ..... 358/1.13, 1.16, 1.15, 471, 474, 497, 1.1, 358/1.12, 1.14, 1.17, 1.18, 1.3, 1.5, 1.8, 358/1.9, 2.1, 401, 404, 487, 489, 493, 358/498, 500

See application file for complete search history.

(56) References Cited

U.S. PATENT DOCUMENTS

| | | | | |
|---|---|---|---|---|
| 6,101,576 A | * | 8/2000 | Kobayashi | G06F 12/08 358/1.11 |
| 6,870,646 B1 | * | 3/2005 | Yamamoto | H04N 1/00204 358/442 |
| 6,927,879 B2 | * | 8/2005 | Takahashi | H02G 11/006 174/158 R |
| 6,975,436 B2 | * | 12/2005 | Saito | H04N 1/00519 358/483 |

(Continued)

FOREIGN PATENT DOCUMENTS

| | | |
|---|---|---|
| JP | 2001-075193 A | 3/2001 |
| JP | 2002-112441 A | 4/2002 |

*Primary Examiner* — Negussie Worku
(74) *Attorney, Agent, or Firm* — Manabu Kanesaka

(57) ABSTRACT

A mechanism for fixing a transmission cable enables a wiring shape of a flat cable to be held relatively reliably when the cable is acted upon by torsion force, tensile force and the like from the outside without the cable skin sustaining damage. A foldable insulation sheet is joined in folding surfaces, and a position of the flat cable is regulated by at least the fold portion thereof and joint portion. The mechanism is includes a flat cable, a foldable insulation sheet, and joint portions for joining folding surfaces of the insulation sheet. At least one of the fold portion of the insulation sheet and the joint portions is disposed in a position for regulating the flat cable. Thus, the flat cable is nipped by the folding surfaces of the insulation sheet, and its wiring shape is held by the fold portion or the joint portion.

7 Claims, 9 Drawing Sheets

(56) References Cited

U.S. PATENT DOCUMENTS

| | | | | |
|---|---|---|---|---|
| 7,119,933 B2* | 10/2006 | Sugimoto | H04N 1/00 |
| | | | 235/454 |
| 7,161,716 B1* | 1/2007 | Kawasaki | H04N 1/1017 |
| | | | 355/75 |
| 7,224,495 B2* | 5/2007 | Yui | H04N 1/00976 |
| | | | 358/474 |
| 2006/0001916 A1* | 1/2006 | Sheng | H04N 1/00204 |
| | | | 358/474 |
| 2013/0188375 A1* | 7/2013 | Masuda | F21V 21/00 |
| | | | 362/509 |
| 2016/0014289 A1* | 1/2016 | Tamai | H04N 1/00549 |
| | | | 358/474 |
| 2016/0191740 A1* | 6/2016 | Ozawa | H04N 1/00984 |
| | | | 358/474 |
| 2016/0295058 A1* | 10/2016 | Yoshihara | H04N 1/00994 |
| 2016/0295060 A1* | 10/2016 | Takahashi | H04N 1/02815 |
| 2016/0309048 A1* | 10/2016 | Yang | H04N 1/00551 |

* cited by examiner

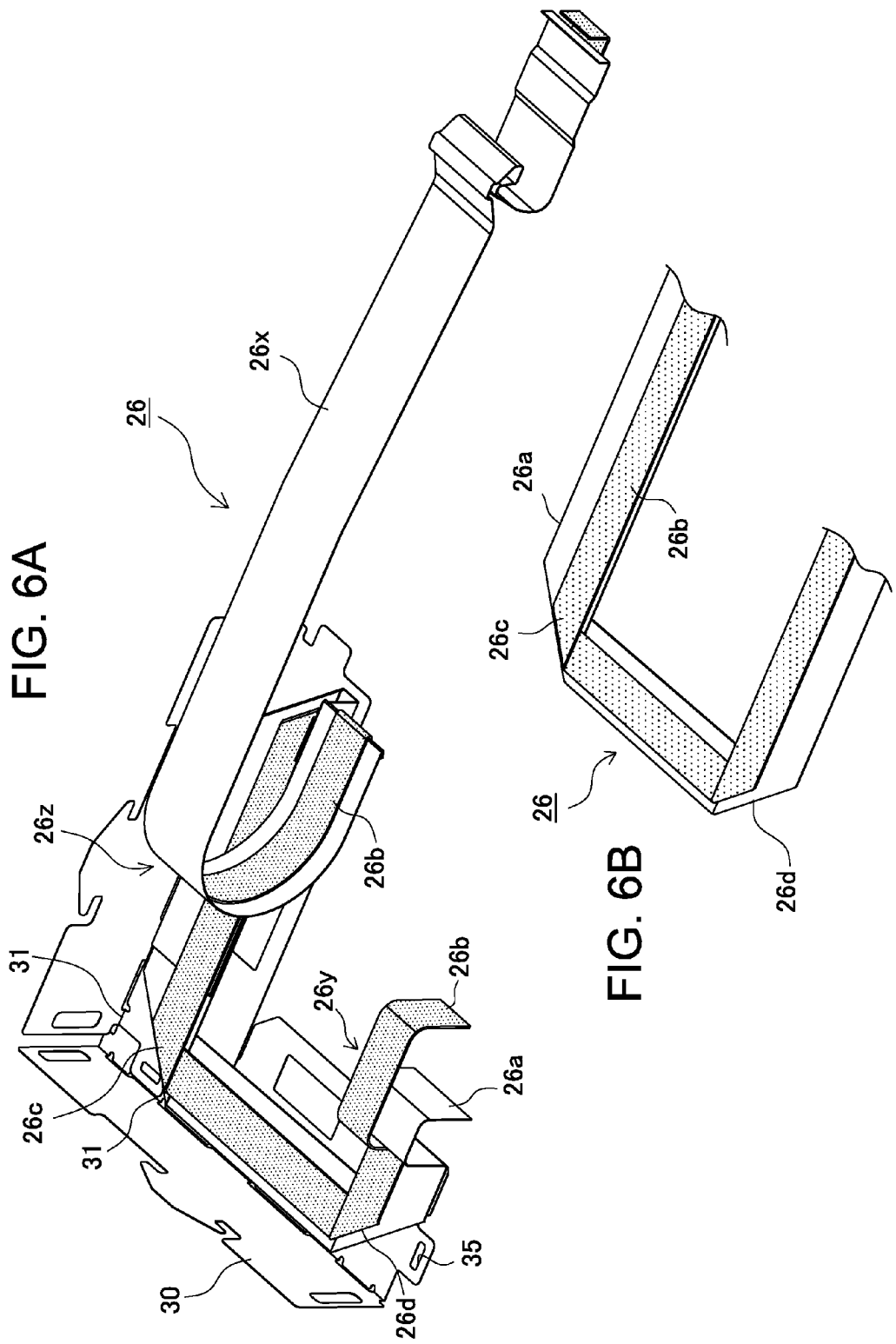

x-x Cross section y-y Cross section

MECHANISM FOR FIXING TRANSMISSION CABLES AND APPARATUS FOR READING IMAGES PROVIDED WITH THE MECHANISM

TECHNICAL FIELD

The present invention relates to a mechanism for fixing transmission cables electrically connecting between a scanning unit and a control power supply section in an image reading apparatus or the like, and more specifically, to a mechanism for fixing a cable with the transmission cable undergoing little physical damage, deterioration of electric signal and propagation of noise.

BACKGROUND ART

Conventionally, in an image reading apparatus, transmission cables have been installed inside an apparatus housing to supply electric signals or power from a control board to a scanning unit that shifts along an image original document.

For example, in Patent Document 1, a flat cable is connected between the scanning unit and the control board, one end of the flat cable is coupled and fixed to a connector of the control board, and the other end is coupled to the scanning unit. Then, installation is made so that the cable becomes deformed in association with the shift (scanning operation) of the scanning unit.

In such a cable structure in which one end is fixed to the board and the other end is fixed to the scanning unit, there is a problem that the cable is broken by action of external forces such as torsion of the cable and tensile force, or the outer sheath sustains damage to cause a short circuit.

Therefore, Patent Document 2 discloses a mechanism for covering a portion susceptible to damage of a cable with a sheet so as to reduce breakage due to torsion of the cable or the tensile force from the outside. The Document proposes a structure for inserting an end portion of the cable into a cut slit formed in the plastic sheet to protect.

PRIOR ART DOCUMENT

Patent Document

[Patent Document 1] Japanese Patent Application Publication No. 2001-075193
[Patent Document 2] Japanese Patent Application Publication No. 2002-112441

Disclosure of Invention

Problems to be Solved by the Invention

As described above, in wiring a flat cable for supplying power or transmitting control signals from a fixed portion such as a control board to a unit that shifts for image reading or the like, for example, Patent Document 2 and the like propose the structure for holding a portion easy to twist of the cable with a plastic sheet.

Conventionally, a slit to insert the end portion of the cable has been provided in the plastic sheet with an appropriate thickness to fix the cable. Therefore, both the frontside and the backside of the cable are not covered with a protective sheet of plastic or the like, and a part of the cable is sometimes brought into contact with a metal material such as a chassis. Concurrently therewith, since the flat cable is inserted into the cut slit of the plastic sheet or the like, the cable skin sometimes sustains damage by the edge of the slit.

Further, in holding a part of the flat cable with the cut slit, unless the position of the slit formed in the sheet coincides with a fixed portion of the cable, it is not possible to hold the cable in a correct posture.

Furthermore, when the cable contacts a metal material, the dielectric constant of the cable changes, and there is a case that the signal transmitted inside the cable deteriorates. Still furthermore, as an inverse case, the signal transmitted inside the cable is sometimes propagated from the contact portion between the cable and the metal material to the metal material to generate radio noise.

It is an object of the present invention to provide a mechanism for fixing a transmission cable for enabling a wiring shape of a flat cable to be held relatively reliably when the cable is acted upon by torsion force, tensile force and the like from the outside, avoiding contact with a metal material without the cable skin sustaining damage, and causing neither signal deterioration nor radio noise.

Means for Solving the Problem

In order to attain the above-mentioned object, in the present invention, a foldable insulation sheet is joined in folding surfaces, and a position of the flat cable is regulated with at least one of the fold portion thereof and joint portion.

The invention of claim 1 is comprised of a flat cable 26, a foldable insulation sheet 30, and a joint section forming joint portions 32, 33, 34 for joining folding surfaces of the sheet. At least one of a fold portion 31 of the sheet and the joint portions 32, 33, 34 is disposed in a position for regulating the flat cable.

By this means, the flat cable is nipped by the folding surfaces of the sheet, and a wiring shape thereof is held by the fold portion or joint portion.

In the invention of claim 2, the joint section adopts a joint layer structure such as an adhesive layer, a welding layer and a crimp layer formed on the folding surfaces, a joint tool structure such as a tie tool and a binding needle attached to the folding surfaces, or a fit structure such as a protrusion portion and a concave fit portion and a slit and an insertion piece formed in the folding surfaces to engage in each other.

By this means, it is possible to select a suitable joint structure corresponding to a material of the flat cable to hold, a shape thereof, and a level of force acting from the outside.

In the invention of claim 3, a retaining fix portion 35 is formed in the sheet to fix to a structure (chassis described later or the like), and the retaining fix portion is comprised of a retaining hole that engages in a protrusion (hook 36 described later) of the structure, or a lock hook that engages in a concave portion of the structure.

By this means, the flat cable is protected with the sheet, the sheet is fixed to the structure such as a chassis, the force to fix does directly not act on the flat cable, and damage is thereby not induced.

In the invention of claim 4, the sheet is made of a synthetic resin film material, and the slit hole of the joint section and the retaining hole of the retaining fix portion are integrally formed by die cutting forming of the film material.

By this means, it is possible to concurrently form the slit to join the folding surfaces and the retaining hole to fix the sheet by die cutting forming of the film material.

In the invention of claim 5, in the sheet, the joint portions are disposed while being spaced a predetermined distance apart from the fold portion, and a position of the flat cable is regulated between the fold portion and the joint portion.

By this means, the flat cable is regulated to be nipped with the fold portion of the sheet and the joint portions, and is thereby reliably held in the position relatively.

In the invention of claim 6, the flat cable is bent and deformed in a crossing direction, and in the sheet are disposed a first joint portion spaced a predetermined distance apart from the fold portion, and a second joint portion in a direction for crossing the fold portion. The fold portion and the first and second joint portions are disposed at distances for regulating the position of the bent deformation portion of the flat cable.

By this means, in the case where the flat cable is wired in the crossing direction, the wiring shape is held by the fold portion and two joint portions, and it is thereby possible to keep the wiring shape relatively reliably also in a complicated wiring shape.

The invention of claim 7 is of an image reading apparatus that adopts the invention of each of the above-mentioned claims, and particularly, the above-mentioned mechanism fixes a transmission cable that electrically connects between a unit section for scanning shifting and a control section of a control board and the like.

By this means, the flat cable does not sustain damage due to scanning operation for repeatedly shifting, and any effect is not exerted on reading operation by torsion of the cable and the like.

Advantageous Effect of the Invention

The present invention is to fold the sheet to hold a part of the flat cable by nipping from the frontside and backside, and position by one of the fold portion and the joint portion, and therefore, exhibits the following effects.

The flat cable is protected with the frontside and backside covered with the sheet, and therefore, even when the cable is acted upon by the external force, the skin is hard to sustain damage. Further, since the cable is positioned by the fold portion or joint portion, the wiring shape is held in a relatively correct posture.

Furthermore, since the frontside and backside of the flat cable are covered with the sheet, the flat cable is capable of avoiding direct contact with another member (particularly, metal material), and it is possible to prevent deterioration of the signal transmitted inside the cable and further prevent generation of radio noise propagated from the cable to a metal casing and the like.

BRIEF DESCRIPTION OF DRAWINGS

FIGS. 6A and 6B contain explanatory views of a form to cover bent portions of the transmission cable with a plurality of protective sheets, where FIG. 6A illustrates a state in which the protective sheets are developed, and FIG. 6B illustrates a state in which transmission cables are layered;

FIG. 7A illustrates a state in which the sheet is developed in the plane, and FIG. 7B illustrates a state in which the transmission cable is layered on the protective sheet;

BEST MODE FOR CARRYING OUT THE INVENTION

Figure 1:
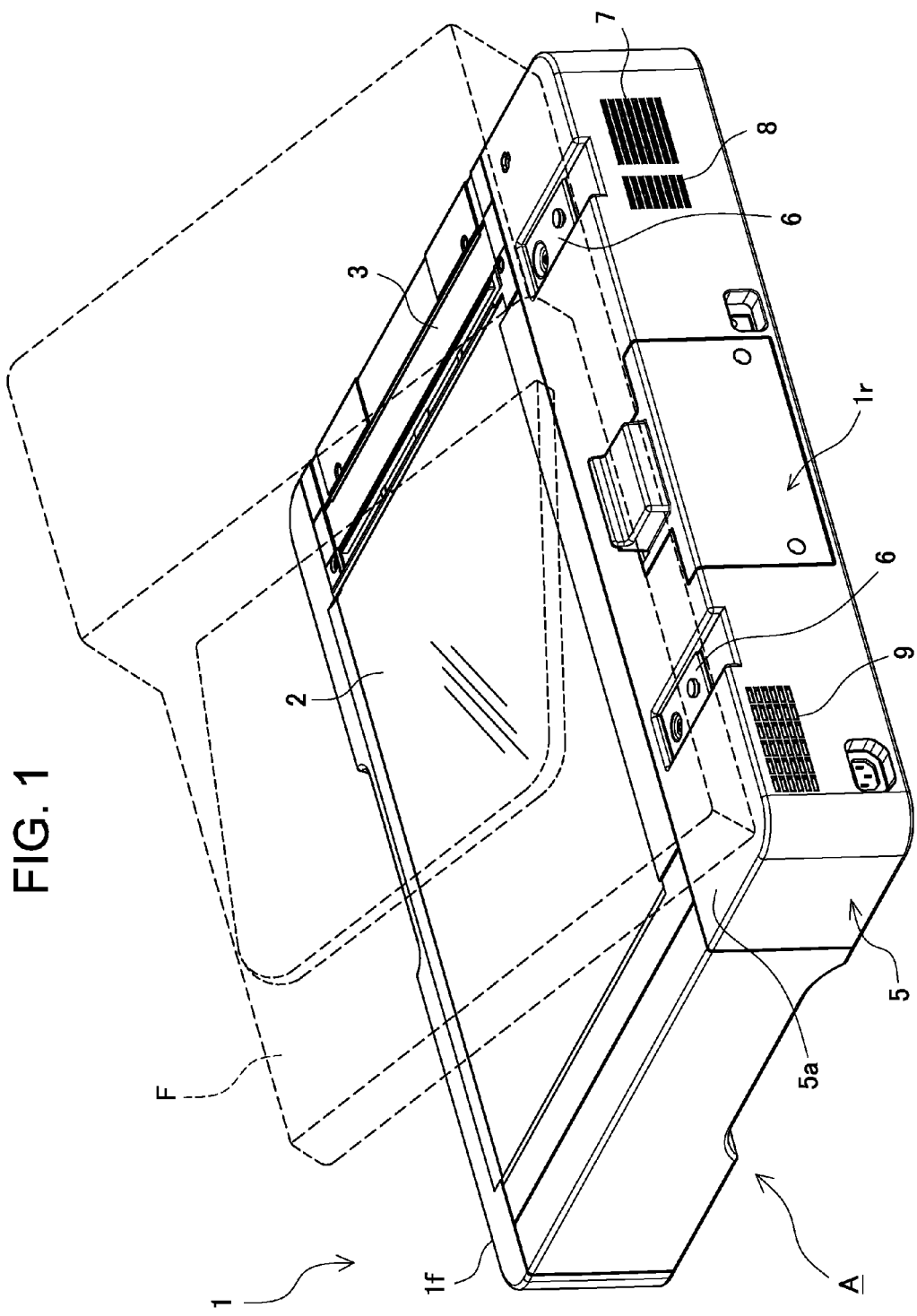
FIG. 1 is a perspective explanatory view illustrating an appearance shape of an image reading apparatus according to the present invention.

The present invention will specifically be described below according to Embodiments shown in drawings. FIG. 1 is an appearance explanatory view of an image reading apparatus A according to the present invention, and is comprised of a casing 1, main platen 2, sub-platen 3 and feeder unit F.

In the casing 1 are disposed the above-mentioned main platen 2, sub-platen 3 and board storage section 5. In the board storage section 5 are disposed various kinds of boards described later, and the section 5 is provided with a hinge attachment section 6 of the feeder unit F. "5a" shown in the figure denotes a top of the casing 1 positioned in the board storage section 5, "7" shown in the figure denotes a first air vent formed in the casing 1, "8" shown in the figure denotes a second air vent, and "9" shown in the figure denotes an air outlet.

Each of the board storage section 5, first and second air vents 7, 8 and air outlet 9 shown in the figure is formed on a side wall surface (rear side frame) 1r on the rear side of the casing 1. Further, the air vent 7 (8) and the air outlet 9 are disposed at a distance in opposite end portions of the rear side frame 1r.

The main platen 2 is comprised of a transparent placement surface to set an image original document in a rest state, and the sub-platen 3 is comprised of a transparent exposure surface to read a shifting image original document fed from the feeder unit F at a constant velocity. In addition, instead of providing the sub-platen 3 particularly, it is also possible to adopt a configuration (one-platen mechanism) for reading a traveling original document with a part of the platen 2.

The first air vent 7 and second air vent 8 are disposed in mutually adjacent positions, and the air outlet 9 is disposed in a position spaced a distance in the sub-scanning direction. Then, outside air sucked from the first air vent 7 and second air vent 8 is sent in the main scanning direction and the sub-scanning direction, and is discharged to the outside from the air outlet 9. By the flows of air, the inside of the casing is cooled.

Figure 2:
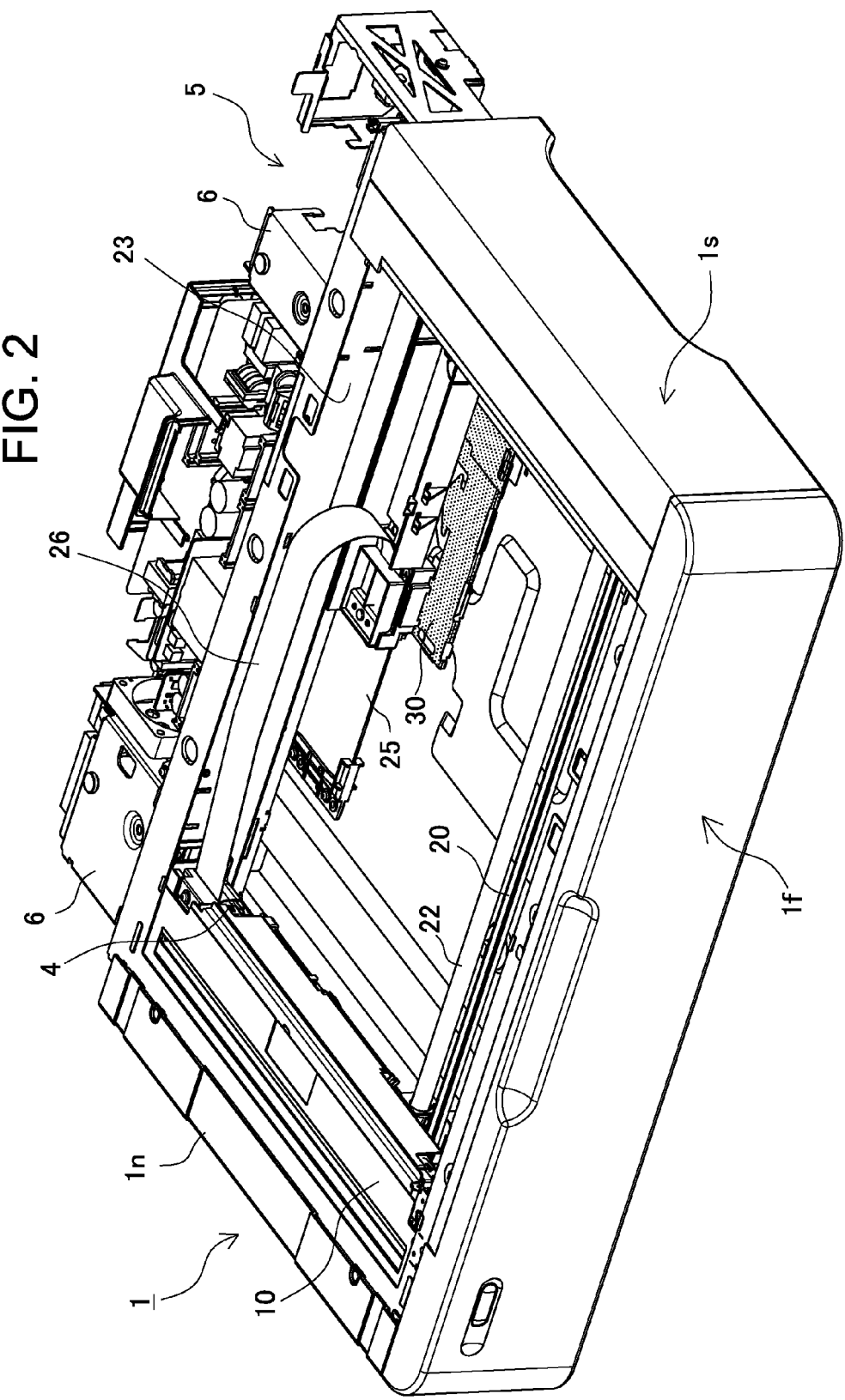
FIG. 2 is a perspective explanatory view illustrating a layout configuration of the apparatus of FIG. 1.
Figure 3:
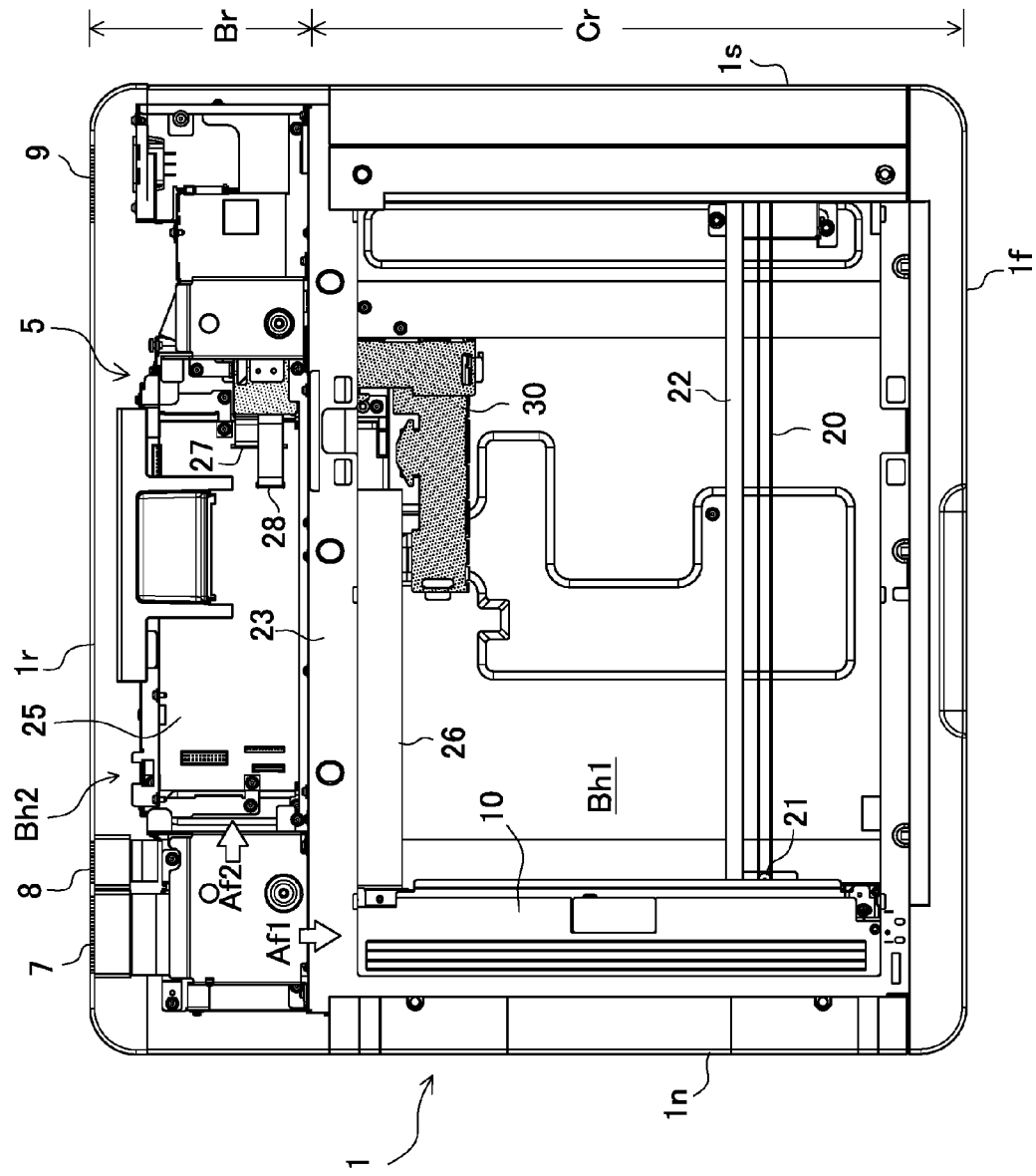
FIG. 3 is a plan explanatory view illustrating a layout configuration of the apparatus of FIG. 2.

FIGS. 2 and 3 illustrate a configuration of the inside of the casing. Inside the casing 1 is incorporated an image reading mechanism 4 for reading an original document image (still image) set on the main platen 2 or a shifting original document (shifting image) traveling on the sub-platen 3 in a line sequential manner.

The image reading mechanism 4 is comprised of one of contact reading structure and reduction optical reading structure. The apparatus shown in the figure indicates the reduction optical system reading structure, and the structure will be described. The image reading mechanism 4 is comprised of a reading carriage 10, light source lamps 11, reflecting mirrors 17, condenser lens 18 and photoelectric sensor 13.

The reading carriage 10 (hereinafter, referred to as "carriage") is supported to be able to shift along a pair of guide members 22 (guide rails, guide rods and the like) disposed between side frames is and in of the casing 1. The carriage 10 reciprocates along the main platen 2, while concurrently shifting to positions between the main platen 2 and the sub-platen 3.

To the reading carriage 10 is coupled a travel tow member 20 such as a timing belt and wire, and the travel tow member 20 is supported by a rotating member 21 such as a pulley and wind-up roll. To this rotating member 21 is coupled a drive motor (not shown in the figure; hereinafter, referred to as "carriage motor"). The travel tow member (timing belt 20), rotating member (pulley 21) and carriage motor (stepping motor) in the apparatus shown in the figure are incorporated into the casing 1.

Figure 4:
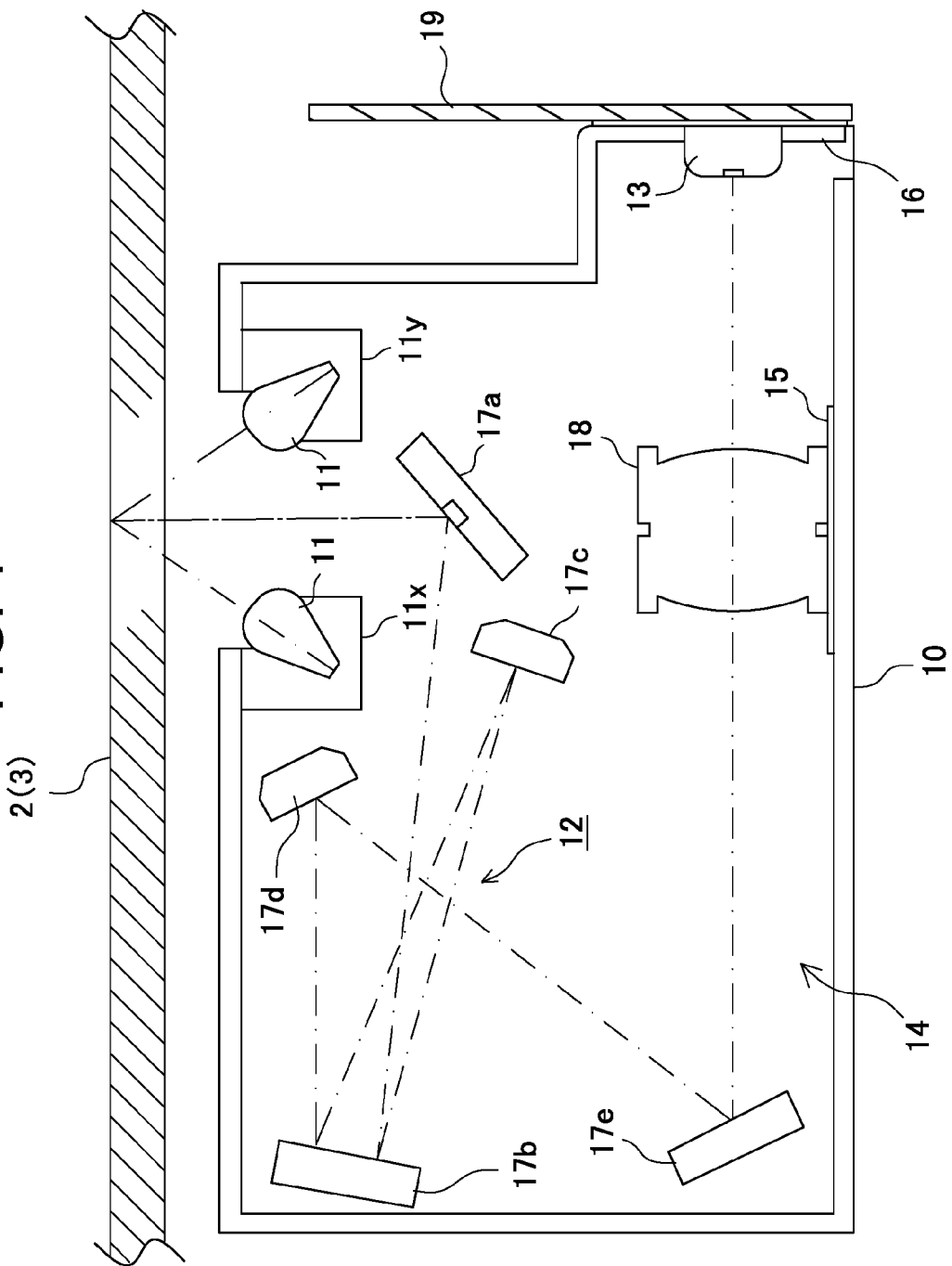
FIG. 4 is a structure explanatory view of a reading carriage of the apparatus of FIG. 1.

An internal structure of the carriage 10 will be described according to FIG. 4. Into the carriage 10 are incorporated the light source lamps 11 (a pair of LED lamps in the apparatus shown in the figure), imaging optical system. 12, and photoelectric converter (photoelectric sensor) 13. The carriage 10 is made of a heat-resistant resin, and lamp placement sections 11x, 11y, mirror fix section 14, lens fix section 15 and sensor board fix section 16 are integrally formed.

The rod-shaped LED lamps (light source lamps) 11 are fixed to the lamp placement sections 11x, 11y, and are disposed to apply light to the original document on the platen. To the mirror fix section 14 are fixed the reflecting mirrors 17 (17a, 17b, 17c, 17d, 17e) having predetermined lengths in the main scanning direction.

Each of the mirrors 17a to 17e reflects reflected light such that the light from the light source lamps 11 is applied to the original document image, and forms an imaging optical path with a predetermined length. In the lens fix section 15, the lens (image formation lens) 18 that condenses output light from the reflecting mirror 17 is attached to be adjustable in position. Further, a sensor board 19 is attached to the sensor board fix section 16, and the photoelectric sensor 13 (photoelectric converter; CCD) is mounted on the board and is disposed so that the light from the condenser lens 18 forms an image on the photoelectric sensor 13 (line sensor).

The light source lamps 11, imaging optical system 12 and photoelectric sensor 13 are arranged in the shape of a line so as to read the original document image in a line sequential manner. In other words, the photoelectric sensor 13 is a line sensor (CCD or the like), and the condenser lens 18 forms a line image on the line sensor.

Therefore, the reflecting mirrors 17 and light source lamps 11 are configured to emit and reflect line light. Then, the carriage 10 shifts in the sub-scanning direction orthogonal to the main scanning direction of the photoelectric sensor 13 (sensor alley).

In addition, the Embodiment is described in which the photoelectric sensor 13 and condenser lens 18 are mounted on the carriage 10, and it is also possible to fix the imaging optical system 12 to the bottom portion of the casing 1, for example, chassis. In this case, a transmission cable 26 described later is comprised of a power supply line and control line thereof.

[Board Structure]

Board configuration and arrangement will be described with reference to FIG. 3. The board storage section 5 is disposed inside the casing 1. The casing 1 shown in the figure is provided with a barrier wall 23 to partition the inside of the box-shaped casing into a carriage travel area Cr and a board placement area Br. The board storage section 5 is comprised of space enclosed with the barrier wall 23, side wall surface (rear side frame) 1r on the rear side, top 5a and bottom plate (chassis) 5b (hereinafter, this space is referred to as second blast housing Bh2).

Further, in the carriage travel area Cr partitioned by the barrier wall 23 is formed space (hereinafter, this space is referred to as first blast housing Bh1) enclosed with the barrier wall 23, a side wall surface (front side frame) if on the front side, platens 2, 3 and bottom plate (chassis). Thus, by the barrier wall 23 are formed an air flow Af2 (sub-scanning direction blast path) to send air to the board placement area Br and an air flow Af1 (main scanning direction blast path) to send air to the carriage scanning area Cr.

In the board storage section 5 are disposed a plurality of boards 24, 25 such as a power supply board 24 to supply power to the light source lamps 11 stored in the carriage 10, a control board 25 to control the carriage motor and control reading of the photoelectric sensor 13 of the sensor board 19, and an image processing board (the board shown in the figure is integrally formed on the board 25) to process data from the sensor board 19 mounted on the carriage 10.

[Transmission Cable]

Figure 5:
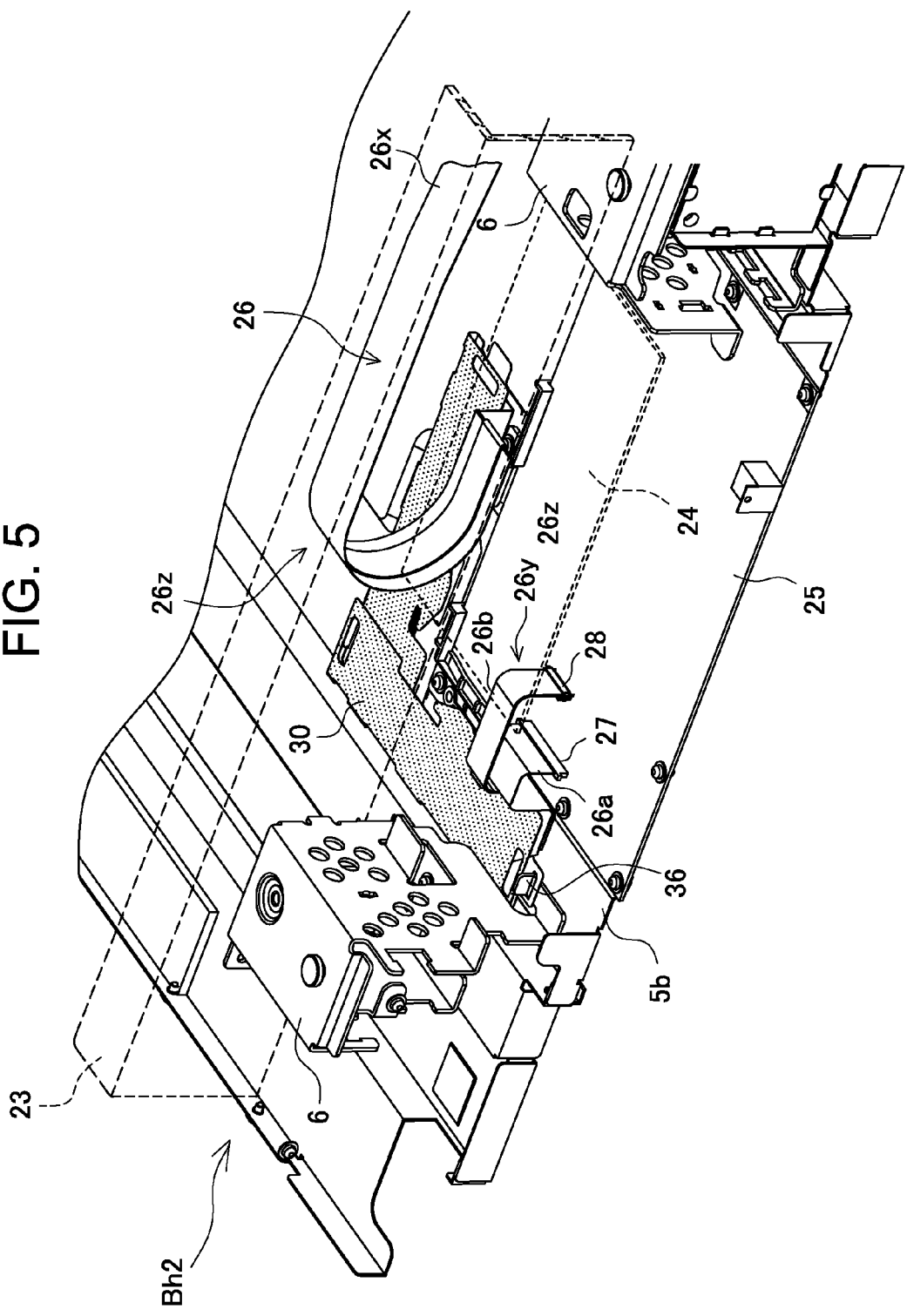
FIG. 5 is an explanatory view of assembly of a transmission cable in the apparatus of FIG. 1.

A configuration of the transmission cable will be described with reference to FIG. 5. The transmission cable 26 is disposed between the sensor board 19 mounted on the carriage 10 and the control board 25. The transmission cable 26 is comprised of a flat cable formed of a power supply line (power supply cable) 26a to supply power to the sensor board 19 and light source lamps 11, and a plurality of signal transfer lines (data transfer cable) 26b such as a data line to transmit image data read with the photoelectric sensor 13, and control data lines to control lamp flashing and photoelectric conversion. The transmission cable 26 shown in the figure is formed of a flexible cable that becomes deformed in association with a shift of the carriage 10.

Assembly of the transmission cable 26 into the casing will be described next. The transmission cable 26 in the apparatus shown in the figure is comprised of two flat cables of power supply cable 26a and data transfer cable 26b. Both of the cables 26a and 26b are routed integrally in a state in which the cables are overlapped vertically in the layered shape. Hereinafter, the two cables will be described as the transmission cable 26 (the cable may be formed of a single cable according to apparatus specifications).

The transmission cable 26 is comprised of a movable connection portion 26x, fix connection portion 26y and flexible harness portion 26z for connecting between both of the connection portions. The movable connection portion 26x is coupled to the carriage 10 with a connector not shown. The fix connection portion 26y is coupled to connectors 27, 28 disposed on the control board 25. The connector 27 is connected to the power supply cable 26a, and the connector 28 is connected to the data transfer cable 26b. Further, the flexible harness portion 26z deforms (deforms in the shape of a loop) in association with a shift of the carriage, and deforms flexibly by torsion and the like in assembling the harness (see FIG. 5).

FIGS. 6A and 6B contain explanatory views of a fix mechanism 30 that protects the cable in wiring the transmission cable 26 in the casing 1. The transmission cable 26 is deformed in the shape of a straight line, the shape of a U, the shape of an L and the like corresponding to routing. The cable shown in the figure is formed approximately in the shape of a U in a first bent portion 26c and a second bent portion 26d. In this state, the transmission cable 26 is acted upon by a force (internal stress) for restoring the shape to the original linear shape.

Therefore, there arise the need for holding the transmission cable 26 in the wiring shape, and the need for preventing twisting from occurring due to motion (motion driven by scanning operation of the carriage 10) of the movable connection portion 26x, and concurrently protecting the cable 26 not to be broken by outside protrusions. "30" shown in the figure denotes a protective sheet, and is formed in the shape of partially covering the transmission cable 26. For example, the protective sheet 30 is a synthetic resin sheet having insulation properties, and is formed in the thickness and strength for protecting against outside protrusions acting on the transmission cable 26. The protective sheet 30 shown in the figure is formed of a polypropylene resin.

The protective sheet 30 is formed of a foldable sheet (paper, plastic film and the like), and for example, is folded in the center portion (fold line) 31. The sheet shape (outside shape, area, size dimensions) is formed to enable principal parts (for example, first and second bent portions 26c, 26d) of the transmission cable 26 to be nipped in a state of being folded in two.

The sheet material is polypropylene resins, fluoroethylene resins, cardboard, corrugate cardboard and the like, and is selected on the conditions that the transmission cable 26 which is nipped and covered holds the shape thereof, does not sustain damage by outside protrusions, and does not shift accidentally, and the like.

Figure 7A:
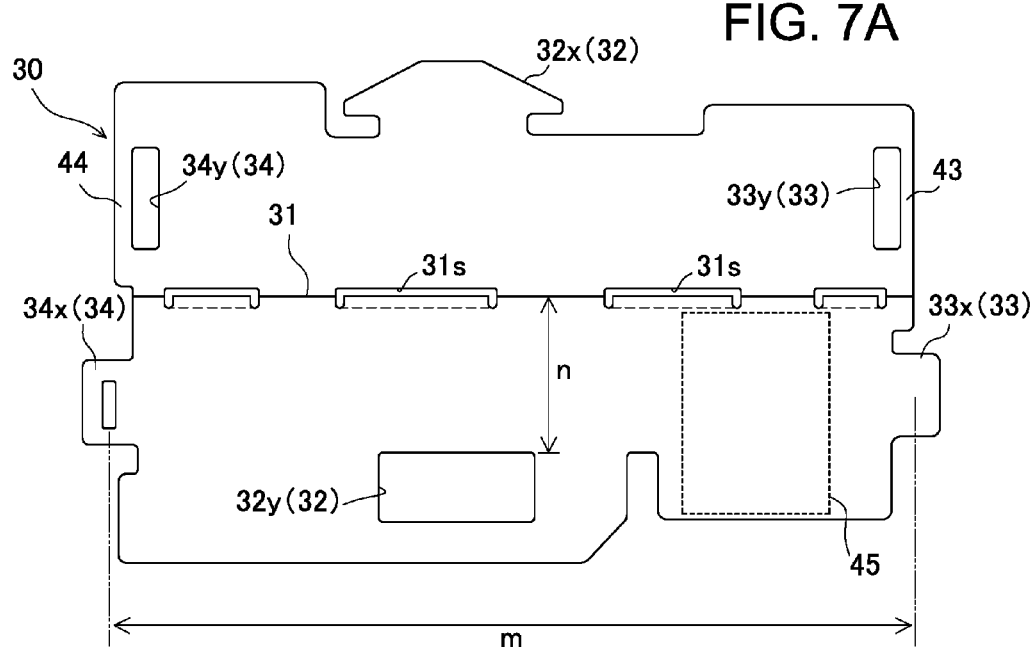
FIGS. 7A and 7B contain explanatory views of the protective sheet to cover the transmission cable in the apparatus of FIG. 1, where

FIG. 7A illustrates the plane shape (developed state) of the protective sheet 30. The sheet is processed in the shape of enabling the fold line 31 (fold portion) in the center to be folded easily. The fold processing is provided with perforation, slit groove, thin line or the like (there is no need of fold processing in materials easy to fold). In the processing shown in the figure, a plurality of slit grooves 31s is formed by die cutting along the fold line 31.

In the protective sheet 30 are formed joint portions 32, 33, 34 that join in a state in which the sheet is folded in two in the fold line 31. In the protective sheet 30 shown in the figure are formed the first joint portion 32 spaced a distance n away from the fold line 31, and the second joint portion 33 and third joint portion 34 in the direction orthogonal to the fold line 31. A distance m is formed between the second joint portion 33 and the third joint portion 34.

The distance n is formed to be almost the same distance or slightly wider distance as/than a cable width p (n≥p). Further, the distance m is formed to be almost the same distance or slightly wider distance as/than a cable wiring dimension q of the shape of a U (m≥q).

The principal parts of the transmission cable 26 are thus protected to be sandwiched between folding surfaces of the folded protective sheet 30, and some portions thereof are joined as appropriate. At this point, at least one of the fold portion 31 and joint portions 32, 33, 34 is disposed in a position for regulating the position of the transmission cable 26. By this means, the transmission cable 26 holds its shape deformed corresponding to the routing, is insulated, and is guarded in strength against external forces of outside protrusions and the like.

Figure 7B:
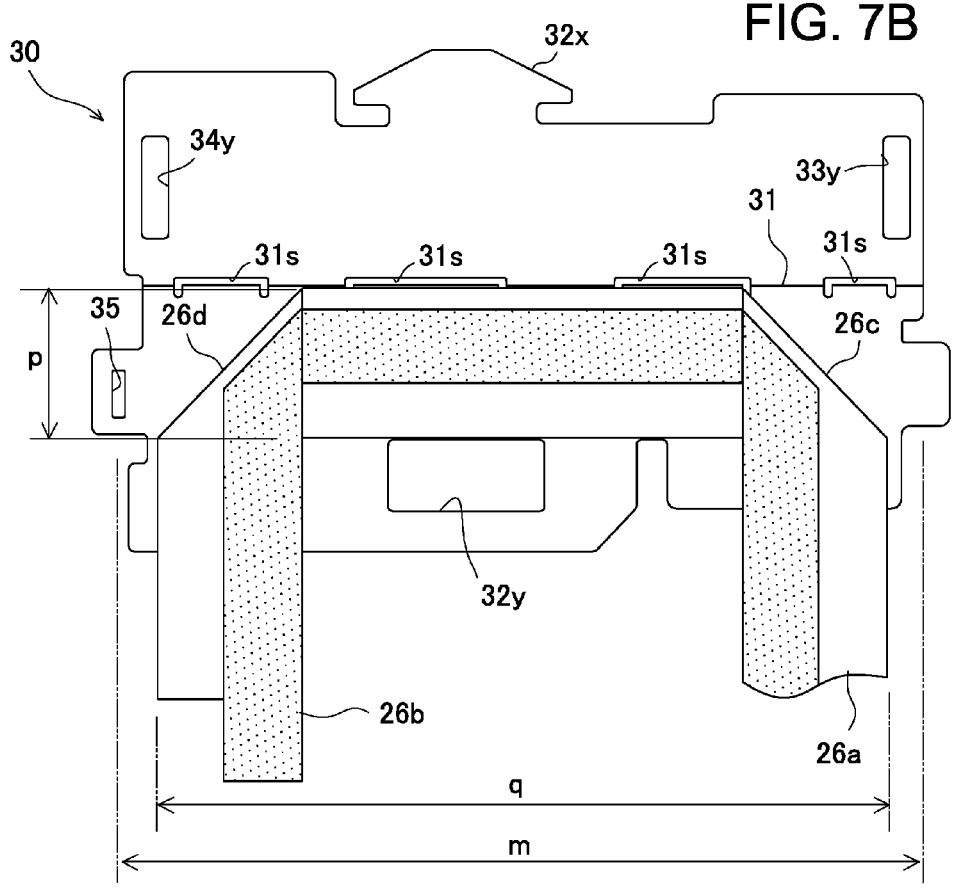

Described next is a joint section of the first joint portion 32, second joint portion 33 and third joint portion 34. In Embodiment 1 as shown in FIGS. 7A and 7B, fit concave portions 32y, 33y, 34y are formed on one of folding surfaces of the protective sheet 30, and fit protrusion portions 32x, 33x, 34x are formed on the other one of the folding surfaces. Then, the fit protrusion portions 32x, 33x, 34x are respectively fitted into the fit concave portions 32y, 33y, 34y.

The fit concave portions and protrusion portions in FIGS. 7A and 7B are formed of slit grooves and insertion pieces integrally formed in the protective sheet 30. The second slit groove 33y, third slit groove 34y and first insertion piece 32x are formed on one (upper surface in FIG. 7A) of the folding surfaces of the protective sheet 30. Further, the second insertion piece 33x, third insertion piece 34y and first slit groove 32y are formed on the other one (lower surface in FIG. 7A) of the folding surfaces.

Figure 8A:
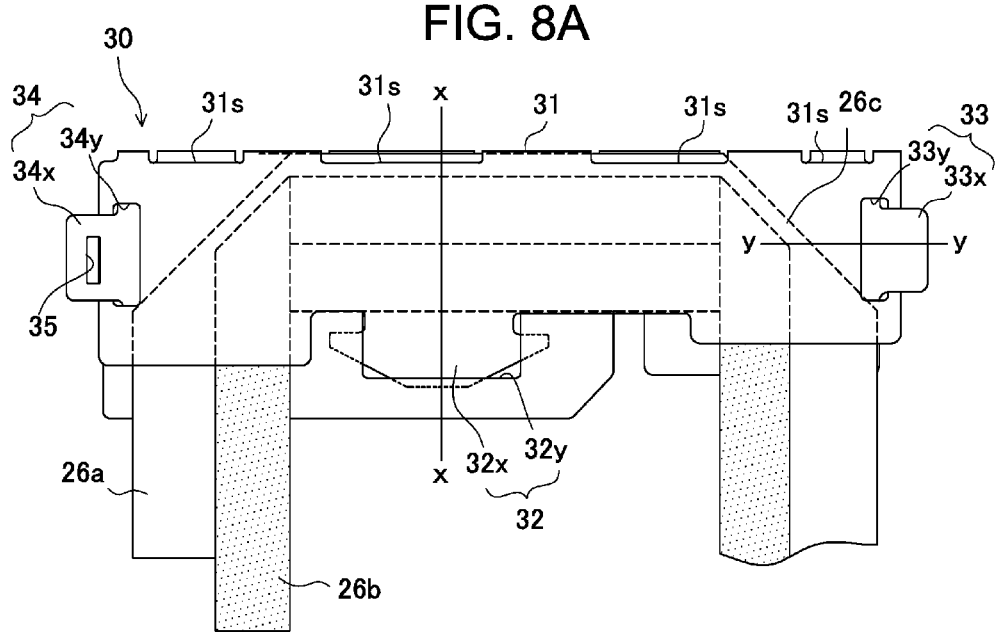
FIG. 8A illustrates a state in which bent portions of the transmission cable are covered with the protective sheet.

FIG. 8A illustrates a state in which the transmission cable 26 is nipped in the frontside and backside by the protective sheet 30 with the transmission cable 26 bent in the shape of a U in the first bent portion 26c and second bent portion 26d. The second joint portion 33 and third joint portion 34 shown in the figure are disposed so as to prevent (regulate the position) the transmission cable 26 from shifting to positions inside the sheet, as in the first joint portion 32.

Figure 8B:
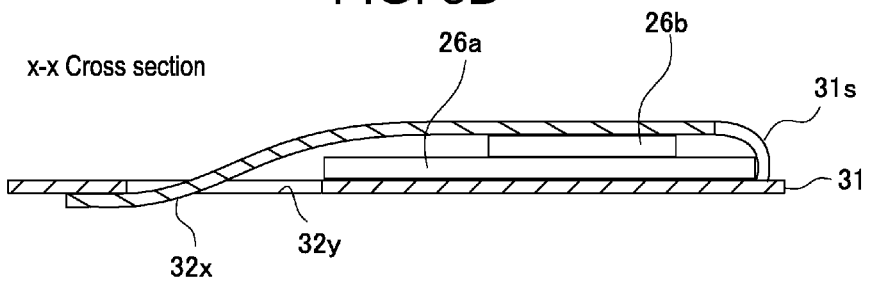
FIG. 8B is a line x-x cross-sectional view.
Figure 8C:
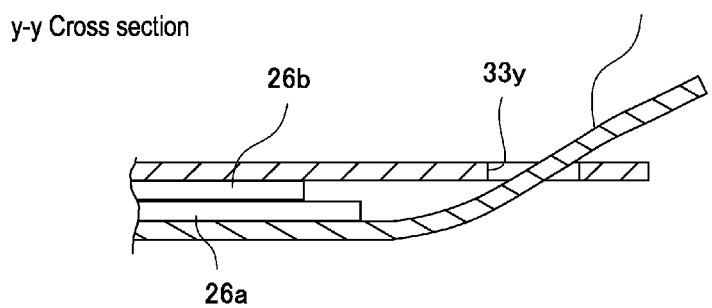
FIG. 8C illustrates a line y-y cross-sectional view.

FIG. 8B illustrates a joint state of the first joint portion 32 in a line x-x cross section of FIG. 8A, and FIG. 8C is a line y-y cross-sectional view and illustrates a joint state (the same as in a fourth joint portion) of the second joint 33. The protective sheet 30 is provided with a retaining hole 35 that engages in a protrusion 36 of the structure (attachment section 6 of the hinge unit shown in FIG. 5).

Thus, in the protective sheet 30, the slit grooves 32y, 33y, 34y and insertion pieces 32x, 33x, 34x respectively fitted into the grooves are integrally formed to mutually joint the folding surfaces folded (in two) along the fold line 31, and further, the retaining hole 35 to fix to the structure inside the casing is integrally formed. As the processing thereof, for example, it is possible to integrally form by performing die-cutting forming on a plastic film.

Further, to the protective sheet 30 is bonded a double-faced tape (not shown) to attach to the bottom chassis or the like of the casing 1. Moreover, it is also possible to form a protrusion portion in the protective sheet 30, form a fit hole in the structure of the casing 1 and join the portion and hole.

In the case of bonding a double-faced tape 45 to the protective sheet 30 to attach to the bottom chassis or the like of the casing 1, the double-faced tape 45 is bonded to the surface of the protective sheet 30 with the second insertion piece 33x and third insertion piece 34x formed, and is bonded to the bottom chassis or the like of the casing 1.

The transmission cable 26 bent approximately in the shape of a U in accordance with the routing shape is acted upon by the force for restoring to the original linear shape, and the force for opening the folded protective sheet 30. As described in the foregoing, since the doubled-faced tape 45 is bonded to the surface of the protective sheet 30 with the second insertion piece 33x and third insertion piece 34x formed, and is bonded to the bottom chassis or the like of the casing 1, the force for restoring the bent transmission cable 26 to the original shape works on the surface with the second slit groove 33y and third slit groove 34y formed.

The force for restoring to the original shape acts to open the surface with the second slit groove 33y and third slit groove 34y formed of the protective sheet 30, however, since the second slit groove 33y and third slit groove 34y are formed, the force working on the surface of the protective sheet 30 is not directly transferred to the second insertion piece 33x and third insertion piece 34x fitted into the second slit groove 33y and third slit groove 34y.

Further, since an end portion 43 of the protective sheet 30 corresponding to the second slit groove 33y and an end portion 44 of the protective sheet 30 corresponding to the third slit groove 34y are formed with widths narrower than aperture widths formed in respective fit concave portions, the end portions 43, 44 of the protective sheet 30 warp and absorb the force for opening the protective sheet 30, and the fit is hard to release.

The second slit groove 33y and third slit groove 34y are formed in the end portions in the longitudinal direction of the protective sheet 30, and the first insertion piece 32x is disposed on the side, which crosses the slit groove and is opposed to the fold line 31, between these slit grooves. In the first insertion piece 32x is formed a gill portion wider than the width of the first slit groove 32y corresponding to the piece. As described above, the force for restoring the bent transmission cable 26 to the original shape acts on the surface with the first insertion piece 32x formed, the gill portion engages in the first slit groove, and it is possible to prevent the fit from being released.

Figure 9A:
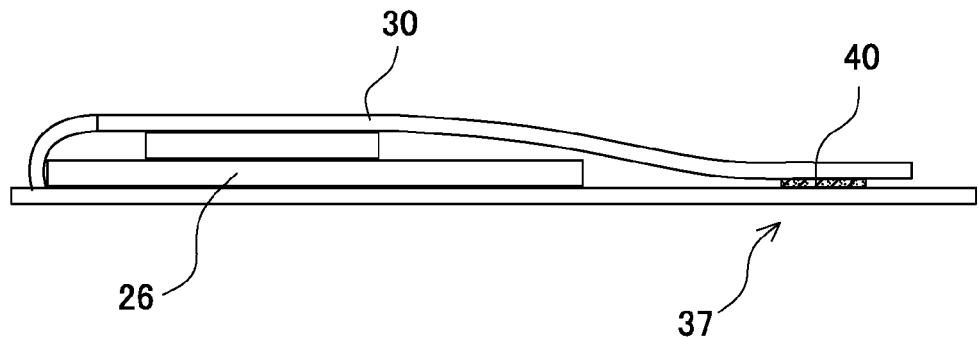
FIGS. 9A to 9C are explanatory views illustrating Embodiments of a joint section different from FIGS. 7A and 7B.
Figure 9B:
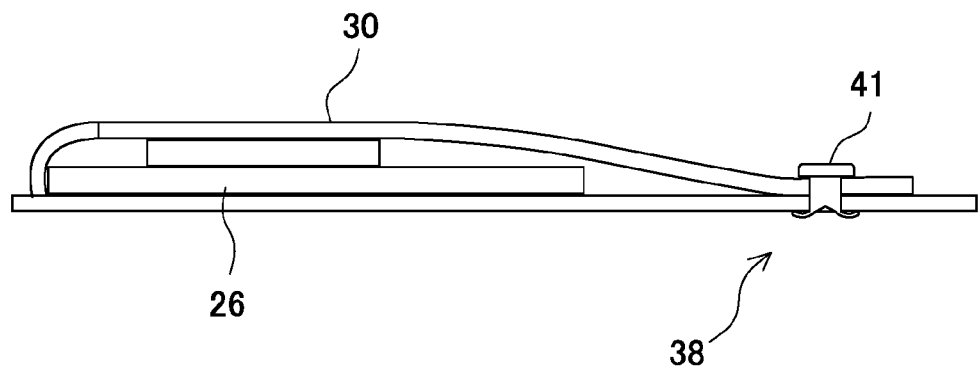
Figure 9C:
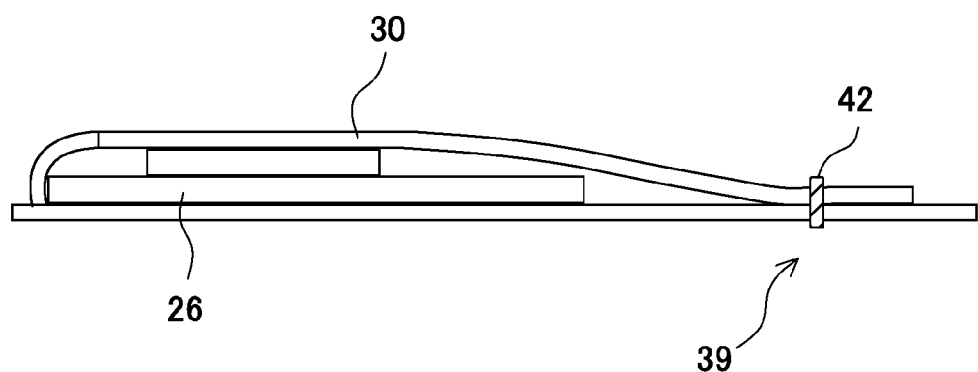

FIGS. 9A to 9C illustrate Embodiments of joint sections 37, 38, 39 different from FIGS. 7A and 7B, and FIG. 9A illustrates a joint layer structure 40 such as an adhesive layer, welding layer and crimp layer formed on the folding surfaces. Further, FIG. 9B illustrates a rivet 41 attached to the folding surfaces, and FIG. 9C illustrates a joint tool structure such as a staple 42.

As shown in FIGS. 2 and 3, the transmission cable 26 nipped by the protective sheet 30 is disposed in the position coinciding with the shift path in the sub-scanning direction of the reading carriage 10 inside the casing 1. Therefore, in order not to interfere with the shift of the reading carriage, the transmission cable 26 is disposed while being brought into intimate contact with the bottom chassis of the casing 1.

As described previously, the image data read by the photoelectric sensor 13 is transmitted inside the transmission cable 26. For the image data is used a differential interface (LVDS: Low Voltage Differential Signaling) that enables data to be transmitted at a relatively high speed with small amplitude and low power consumption. In the LVDS signal, the amplitude varies with changes in the dielectric constant of the transmission path. The transmission cable 26 is routed in intimate contact with the bottom chassis of the casing 1, and since the protective sheet 30 exists in the intimate contact portion over the entire surface between the transmission cable 26 and the bottom chassis of the casing 1, it is possible to suppress the change in the dielectric constant and transmit stable signals.

Further, conversely, since the transmission cable 26 is prevented from directly contacting the bottom chassis of the casing 1 formed of metal and the like, a propagation path is intercepted in the electric signal propagated from the skin of the transmission cable 26 to the casing 1, and it is also possible to prevent the occurrence of radio noise with the casing 1 as an antenna.

This application claims priority from Japanese Patent Application No. 2014-262016 filed on Dec. 25, 2014 in Japan incorporated herein by reference.

The invention claimed is:

1. A mechanism for fixing a flat cable for transmitting a signal or power to a predetermined device, comprising:
an insulation sheet including a predetermined fold line to regulate a position of the flat cable and foldable in a predetermined fold portion; and
a fixing portion formed on the predetermined device, for fixing the insulation sheet to the predetermined device,
wherein the insulation sheet includes a joint section sandwiching the flat cable and joining folding surfaces folded with the fold line to form a predetermined joint portion, and a retaining fix portion engaging the fixing portion to fix the insulation sheet to the predetermined device.

2. The mechanism for fixing a transmission cable according to claim 1, wherein the joint section is a joint layer structure including an adhesive layer, a welding layer and a crimp layer formed on the folding surfaces, a joint tool structure including a tie tool and a binding needle attached to the folding surfaces, or a fit structure including a protrusion portion and a concave fit portion, and a slit and a insertion piece formed in the folding surfaces to engage in each other.

3. The mechanism for fixing a transmission cable according to claim 2, wherein a retaining fix portion is a retaining hole that engages in a protrusion of the structure formed at the fixing portion, or a lock hook that engages in a concave portion formed at the fixing portion.

4. The mechanism for fixing a transmission cable according to claim 3, wherein the retaining fix portion is formed at the protrusion portion or the insertion piece formed on the folding surface.

5. The mechanism for fixing a transmission cable according to claim 1, wherein in the insulation sheet, the joint portion is disposed while being spaced a predetermined distance apart from the fold line, and a position of the flat cable is regulated between the fold line and the joint portion.

6. The mechanism for fixing a transmission cable according to claim 5, wherein the flat cable is bent and deformed in a crossing direction, and the insulation sheet includes a first joint portion formed while being spaced a predetermined distance apart from the fold line, and a second joint portion disposed in a direction for crossing the fold line, and
the fold line and the first and second joint portions are disposed at distances for regulating a position of a bent deformation portion of the flat cable.

7. An image reading apparatus comprising:
a scanning section adapted to be able to shift along a read image;
a control section adapted to control the scanning section; and
a transmission cable adapted to electrically connect between the scanning section and the control section,
wherein the transmission cable includes the mechanism for fixing a transmission cable according to claim 1.

* * * * *